United States Patent [19]
Schick

[11] Patent Number: 5,757,584
[45] Date of Patent: May 26, 1998

[54] DISK CARTRIDGE HUB LOCKING MECHANISM

[75] Inventor: Brian R. Schick, Eden, Utah

[73] Assignee: Iomega Corporation, Roy, Utah

[21] Appl. No.: 806,319

[22] Filed: Feb. 26, 1997

Related U.S. Application Data

[63] Continuation of Ser. No. 466,276, Jun. 6, 1995, abandoned.

[51] Int. Cl.⁶ ........................................... G11B 17/02
[52] U.S. Cl. ........................................... 360/99.08
[58] Field of Search ...................... 360/98.07, 98.8, 360/99.04, 99.05, 99.08, 99.12, 133; 369/77.2, 261, 263, 264, 266, 270, 271, 290, 291

[56] References Cited

U.S. PATENT DOCUMENTS

| | | | |
|---|---|---|---|
| 3,871,663 | 3/1975 | Stave | 274/10 S |
| 4,175,274 | 11/1979 | Mann | 360/99 |
| 4,347,599 | 8/1982 | Vitale | 369/270 |
| 4,390,979 | 6/1983 | Saito et al. | 369/270 |
| 4,394,700 | 7/1983 | Edwards | 360/133 |
| 4,481,619 | 11/1984 | Oozeki | 369/270 |
| 4,495,613 | 1/1985 | Gagnon | 369/270 |
| 4,532,564 | 7/1985 | Larson et al. | 360/97 |
| 4,532,622 | 7/1985 | Newbold | 369/271 |
| 4,562,570 | 12/1985 | Denton | 369/270 |
| 4,636,904 | 1/1987 | Matsuno | 360/133 |
| 4,731,779 | 3/1988 | Mathunaga | 369/270 |
| 4,755,981 | 7/1988 | Ekhoff | 369/270 |
| 4,786,997 | 11/1988 | Funabashi et al. | 360/97 |
| 4,791,624 | 12/1988 | Stinesen | 369/270 |
| 4,802,158 | 1/1989 | Ogusu | 369/270 |
| 4,829,510 | 5/1989 | Takahashi | 369/290 |
| 4,926,410 | 5/1990 | Suzuki et al. | 369/290 |
| 4,958,839 | 9/1990 | Guzik et al. | 279/2 R |
| 4,982,399 | 1/1991 | Odawara et al. | 369/270 |
| 5,014,143 | 5/1991 | Mori et al. | 360/99.12 |
| 5,048,005 | 9/1991 | Ekhoff | 369/270 |
| 5,050,158 | 9/1991 | Kitada et al. | 369/270 |
| 5,053,903 | 10/1991 | Harney et al. | 360/99.06 |
| 5,054,016 | 10/1991 | d'Alayer et al. | 369/270 |
| 5,056,082 | 10/1991 | Ekhoff | 369/270 |
| 5,115,366 | 5/1992 | Oishi | 360/133 |
| 5,138,606 | 8/1992 | Nishizawa | 369/270 |
| 5,166,920 | 11/1992 | Kogure | 369/270 |
| 5,204,793 | 4/1993 | Plonczak | 360/133 |
| 5,257,152 | 10/1993 | Nagase | 360/99.08 |
| 5,323,379 | 6/1994 | Kim | 369/270 |
| 5,438,564 | 8/1995 | Takahashi | 369/290 |
| 5,459,627 | 10/1995 | Peter | 360/98.08 |
| 5,461,523 | 10/1995 | Hoshi | 360/99.12 |
| 5,467,338 | 11/1995 | Song | 369/270 |
| 5,469,421 | 11/1995 | Aruga et al. | 369/75.1 |
| 5,486,962 | 1/1996 | Boutaghou | 360/99.12 |
| 5,501,760 | 3/1996 | Mukawa | 156/305 |

FOREIGN PATENT DOCUMENTS

| | | |
|---|---|---|
| 0 101 011 A | 2/1984 | European Pat. Off. |
| 0 428 207 A | 5/1991 | European Pat. Off. |
| 21 65 292 A | 6/1973 | Germany. |
| 60-113377 | 6/1985 | Japan ......... 369/270 |
| 60-236151 | 11/1985 | Japan ......... 369/270 |
| 61-9802 | 1/1986 | Japan ......... 369/270 |
| 63-39167 | 2/1988 | Japan ......... 369/270 |
| 01319166 | 12/1989 | Japan ......... 369/270 |
| 06131783 | 5/1994 | Japan ......... 369/270 |

*Primary Examiner*—Stuart S. Levy
*Assistant Examiner*—David D. Davis
*Attorney, Agent, or Firm*—Woodcock Washburn Kurtz Mackiewicz & Norris LLP

[57] ABSTRACT

The hub assembly of a disk cartridge has an annular groove formed in its bottom surface. The outer periphery of the annular groove undercuts the bottom surface of the hub assembly to form an annular lip around the outer periphery of the groove. A data storage device designed to receive the disk cartridge has a spindle motor with at least one latch member mounted on the upper portion of the motor via a flexure. The latch member on the spindle motor enters the annular groove on the hub assembly of the disk cartridge when the disk cartridge is inserted into the data storage device. When the spindle motor spins-up to its operating speed, the latch member moves radially outwardly on its flexure and engages the annular lip in the hub assembly, thereby preventing separation of the hub assembly from the spindle motor during rotation.

35 Claims, 9 Drawing Sheets

DISK CARTRIDGE HUB LOCKING MECHANISM

This is a continuation of application Ser. No. 08/466,276, filed Jun. 6, 1995 now abandoned.

BACKGROUND

1. Field of the Invention

The present invention relates to a mechanism for locking the hub of a removable disk cartridge to the spindle motor of a disk drive upon spin-up of the motor to prevent separation of the hub and spindle motor during high speed rotation.

2. Description of the Prior Art

Removable disk cartridges for storing digital electronic information typically comprise an outer casing or shell that houses one or more rotatable storage mediums, or disks, upon which electronic information can be stored. The cartridge shell often comprises upper and lower halves that are joined together to house the disk(s). The disk(s) is mounted on a hub assembly that rotates freely within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

When the cartridge is inserted into a data storage device, i.e., disk drive, a spindle motor in the drive engages the hub assembly through an opening in the bottom shell of the disk cartridge in order to rotate the disk within the cartridge. In many prior art removable cartridge disk drive systems, a center spindle on the motor engages a through-hole in the hub assembly, and a chucking magnet in the spindle and/or hub assembly provides sufficient force to keep the hub assembly engaged on the spindle motor during rotation. Magnetic chucking provides sufficient engagement in most disk drives that operate at lower rotation speeds, as well as in most disk drive units that are internally mounted in a computer casing.

Applicant has discovered, however, that magnetic chucking is susceptible to failure in higher-speed, standalone disk drive units. In particular, Applicant has found that if a stand-alone, removable cartridge disk drive is somehow gyrated while the spindle motor is operating at full speed, such as might occur if a user lifts the disk drive unit off a table or desk and moves it to a different position, the gyroscopic forces that result from such movement can cause the hub assembly of a disk cartridge to separate from the spinning motor. Separation of the hub assembly from the spinning motor is likely to cause severe damage to both the storage medium in the disk cartridge and to the internal components of the disk drive.

Accordingly, there is a need for a mechanism that prevents separation of the hub assembly from the spindle motor in such situations. The present invention satisfies this need.

SUMMARY OF THE INVENTION

The present invention is directed to a mechanism for locking the hub assembly of a removable disk cartridge to the spindle motor assembly of a data storage device, i.e., disk drive, upon spin-up of the motor to prevent separation of the hub assembly from the spindle motor assembly during high speed rotation. According to the present invention, the hub assembly of the disk cartridge has an annular groove formed in its bottom surface. The outer periphery of the annular groove undercuts the bottom surface of the hub assembly to form an annular lip around the outer periphery of the groove.

A data storage device designed to receive the disk cartridge has a spindle motor that, according to the present invention, comprises a freely rotating cylindrical body having an upper portion that provides a critical datum for engaging the bottom surface of the hub assembly of the disk cartridge. At least one latch member is movably mounted on the upper portion of the cylindrical body. The latch member has a projection that extends above an upper surface of the cylindrical body. The projection has a hook-shaped cross-section adapted to engage the annular lip of the groove formed in the bottom surface of the hub assembly of the disk cartridge. Preferably, the latch member is movably mounted to the cylindrical body via a flexure.

When the disk cartridge is inserted into the data storage device, the bottom surface of the hub assembly engages the upper portion of the cylindrical body of the spindle motor assembly, and the hook-shaped projection on the latch member enters the annular groove in the bottom of the hub assembly. When the spindle motor spins-up to its operating speed, centrifugal forces act on the latch member causing it to move radially outwardly on its flexure until the hook-shaped projection engages the annular lip of the groove in the hub assembly. Once engaged, the latch member prevents the hub assembly from separating from the spindle motor.

When it is time to eject the disk cartridge from the data storage device, the spindle motor assembly is brought back to rest. As the spindle motor assembly spins down, the centrifugal forces on the latch member will dissipate, allowing the latch member to return to a disengaged position. The spindle motor assembly can then be disengaged from the hub assembly.

Preferably, a plurality of latch members are provided on the spindle motor assembly to provide additional security against separation of the hub and spindle motor assemblies.

The foregoing and other objects, features and advantages of the invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

Figure 1:
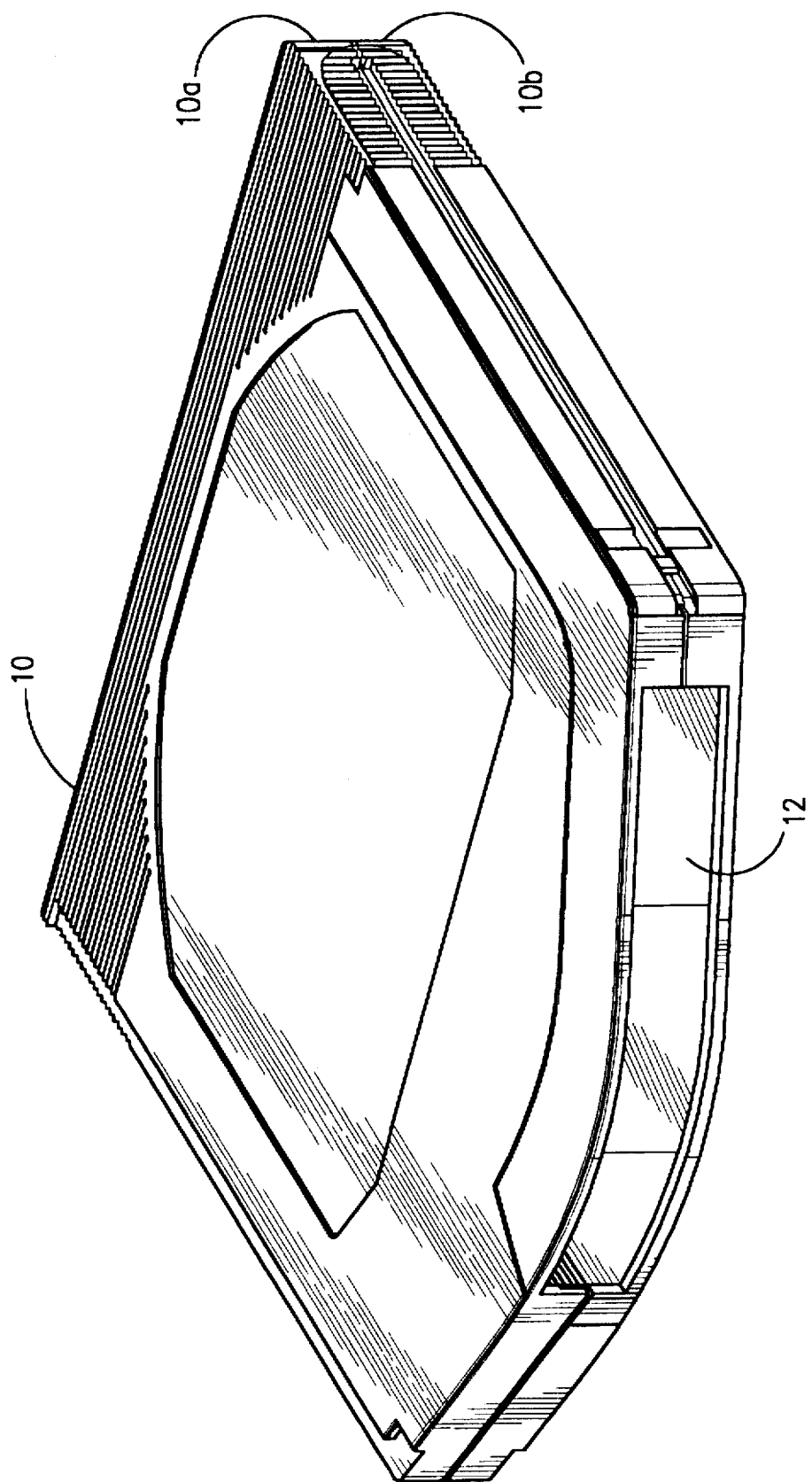
FIG. 1 is a disk cartridge in accordance with a preferred embodiment of the present invention.

Referring to the drawings wherein like numerals indicate like elements throughout, there is shown in FIG. 1 a disk cartridge 10 in accordance with a preferred embodiment of the present invention. The disk cartridge 10 comprises an outer casing consisting of upper and lower shells 10a, 10b, respectively. Preferably, the upper and lower shells 10a, 10b are formed of a rigid plastic material. In the present embodiment, the disk cartridge 10 contains two disk-shaped storage mediums 15a, 15b (FIG. 3A) that are attached, in stacked relation, to a hub assembly 16 (FIG. 2) rotatably mounted within the outer casing. Further details of the hub assembly are provided hereinafter. A door 12 on the casing provides access to the recording disks by the read/write heads of a disk drive. In the present embodiment, the storage media comprise rigid magnetic media, however, other storage media may be employed, such as flexible magnetic media or optical media.

Figure 2:
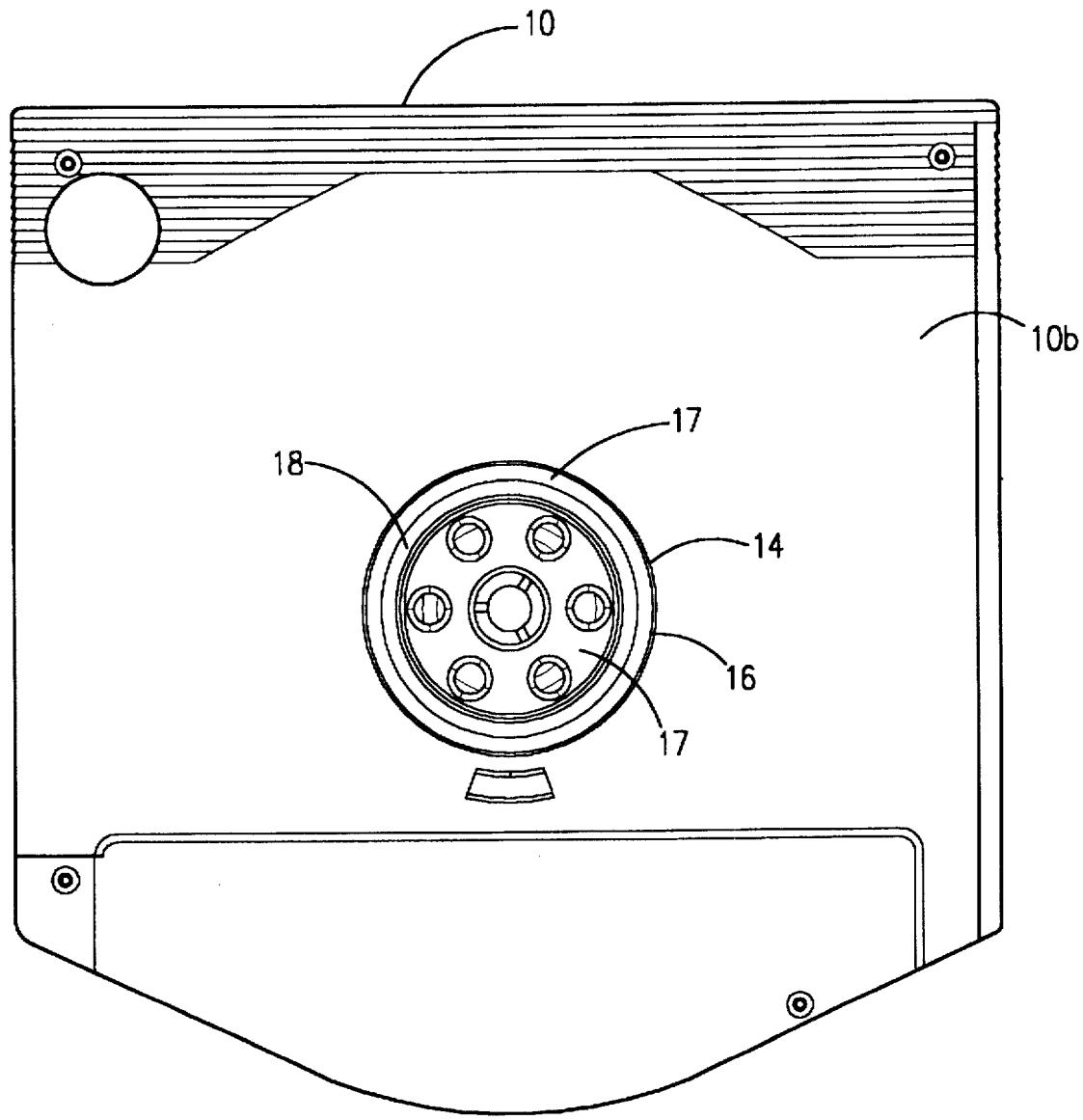
FIG. 2 is a bottom view of the disk cartridge of FIG. 1.

FIG. 2 is a bottom view of the disk cartridge 10 of FIG. 1. As shown, the bottom shell 10b of the disk cartridge has an opening 14 that provides access to the hub assembly 16 within the cartridge 10. As described hereinafter, the spindle motor of a disk drive engages the hub assembly 16 through opening 14 in order to rotate the storage media at relatively high speeds (e.g., 5400 rpm). A slot 15 an the bottom shell engages a retaining tang (not shown) on the spindle motor housing to position the cartridge precisely within the drive.

Figure 3A:
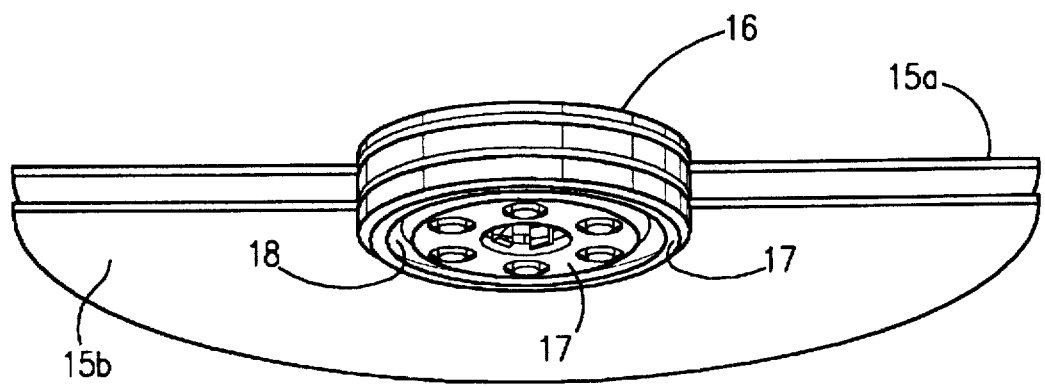
FIG. 3A is a perspective view of the hub assembly of the disk cartridge of FIGS. 1 and 2.
Figure 3B:
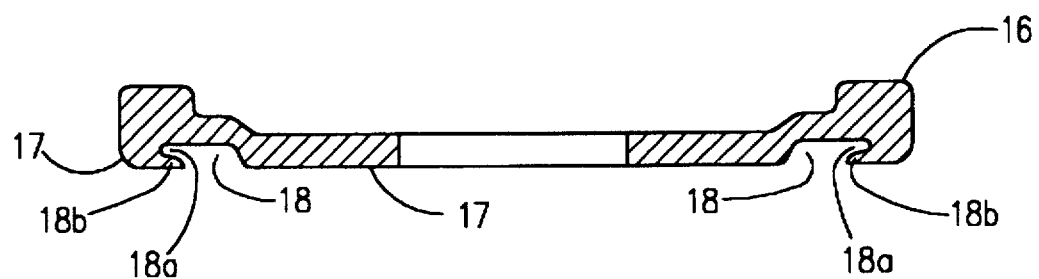
FIG. 3B is a cross-sectional view of a lower portion of the hub assembly of FIG. 3A.

FIGS. 3A and 3B illustrate further details of the hub assembly 16 in accordance with the present invention. As mentioned above, in the present embodiment, two storage media 15a, 15b are mounted on the hub assembly 16. According to the present invention, an annular groove 18 is formed in the bottom surface 17 of the hub assembly 16. As best shown in FIG. 3B, which shows a cross-sectional view of the lower portion of the hub assembly 16, the outer periphery 18a of the annular groove 18 undercuts a portion of the bottom surface 17 of the hub assembly to form an annular lip 18b around the outer periphery of the groove 18. In the present embodiment, the annular groove is approximately 2.2 mm wide and approximately 1.1 mm deep, however, the annular groove is by no means limited to such dimensions. Also, in the present embodiment, the hub assembly 16 is formed mainly of steel, however, other suitable materials may be employed. The purpose and function of the annular groove 18 are described hereinafter.

Figure 4:
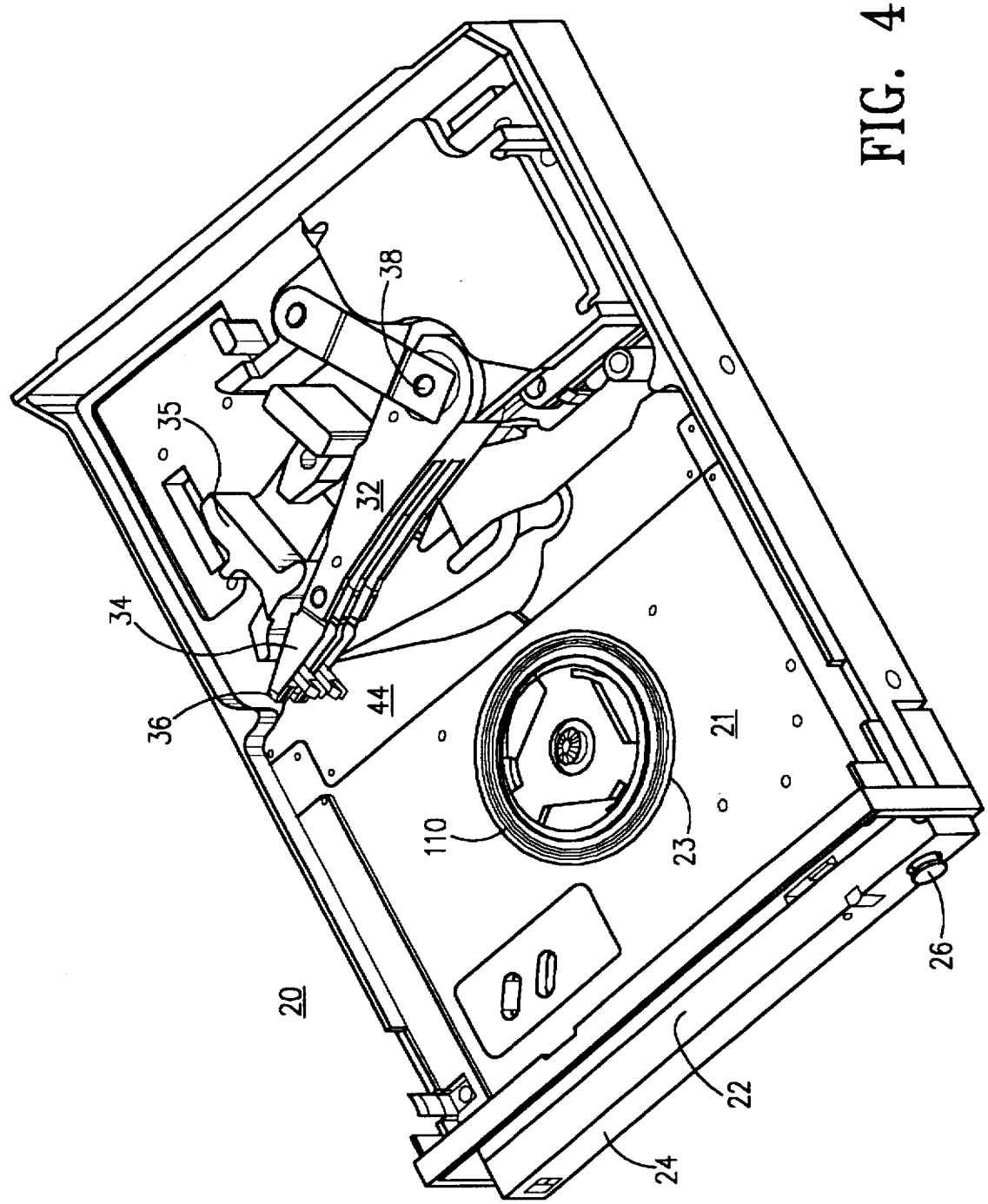
FIG. 4 is a perspective view of a disk drive in accordance with a preferred embodiment of the present invention.

FIG. 4 shows a data storage device, or disk drive 20, in accordance with the present invention. An outer housing (not shown) of the disk drive 20 has been removed to reveal the internal components of the disk drive 20. Most of the components are mounted on an internal chassis 21. A front panel 24 of the disk drive has an elongate, horizontal opening 22 through which the disk cartridge 10 of FIGS. 1-3 can be inserted. An eject button 26 is provided on the front panel 24 for automatically ejecting a disk cartridge from the disk drive 20. In the embodiment shown, the disk drive 20 is configured for insertion into the housing of a computer system, such as a personal computer. However, the disk drive 20 can also be employed as a stand-alone unit. Preferably, the front panel 24 is formed of plastic, and the housing 18 and drive chassis 21 are formed of metal, although other suitable materials may be employed.

An actuator arm 32, which forms part of a radial arm voice coil actuator, is pivotally mounted to the drive chassis 21 at 38. The actuator arm 32 has a plurality of suspension arms 34 at its distal end that each carry a read/write head 36 for recording and reading information to and from respective surfaces of the storage media 15a, 15b of the cartridge 10. A head loading mechanism 35 facilitates loading of the magnetic heads onto the disk surfaces.

A spindle motor assembly 110 of the present invention is mounted on the underside of the chassis 21. A motor ring mechanism (not shown) translates the spindle motor assembly 110 vertically through an opening 23 in the drive chassis 21 in order to engage the bottom surface of the hub assembly 16 of the disk cartridge once the cartridge 10 is inserted in the disk drive 20. Vertical translation of the spindle motor 110 via the motor ring mechanism is described in detail in co-pending, commonly assigned, U.S. patent application Ser. No. 08/438,255, filed May 10, 1995, entitled "Disk Drive Having an Automatic Spindle Motor Loading Mechanism", which is incorporated herein by reference in its entirety.

Figure 5:
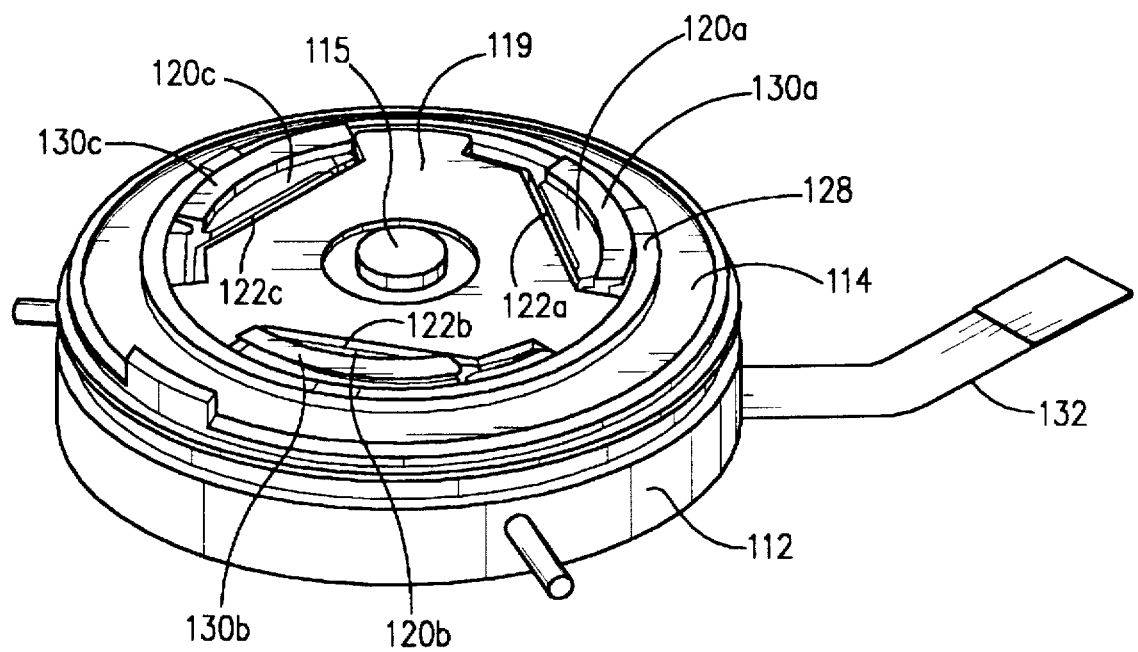
FIG. 5 is a perspective view of the spindle motor assembly of FIG. 4 in accordance with a preferred embodiment of the present invention.

FIG. 5 is a perspective view of the spindle motor assembly 110 of FIG. 4 in accordance with a preferred embodiment of the present invention. As shown, the spindle motor assembly comprises an outer housing 112 that houses a freely rotating cylindrical body 114. An upper surface 128 of the cylindrical body 114 provides a critical datum for engaging the bottom surface of the hub assembly 16 of the disk cartridge of FIGS. 1-3. A center spindle 115 on the cylindrical body 114 is adapted to engage the central aperture of the hub assembly 16 of FIGS. 3A and 3B. Power is supplied to the spindle motor assembly 110 through a flex circuit 132.

According to the present invention, a plurality of latch members 120a-c are movably mounted on the upper portion of the cylindrical body 114. Specifically, each latch member 120a-c is mounted at the end of a respective flexure 122a-c.

As the cylindrical body 114 of the spindle motor assembly 110 rotates, centrifugal forces act upon the latch members 120a-c causing the latch members to move on their respective flexures 122a-c substantially radially outwardly of the cylindrical body 114. In the present embodiment, three latch members 120a-c are movably mounted on the cylindrical body 114, and the three latch members 120a-c are spaced evenly about the circumference of the cylindrical body 114.

Figure 6:
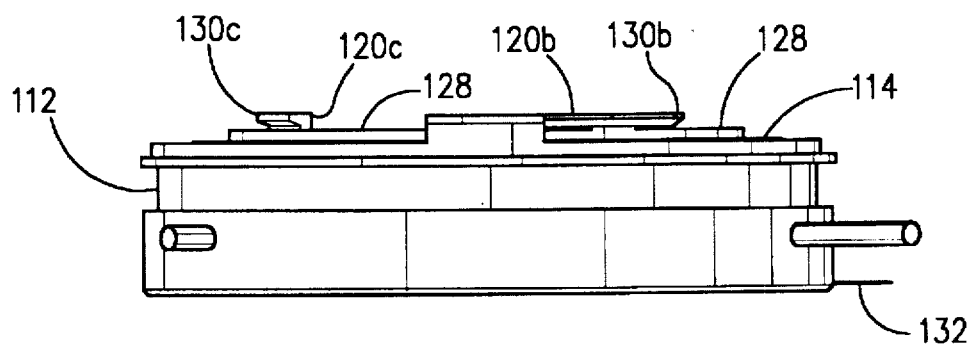
FIG. 6 is a side view of the spindle motor assembly of FIG. 5.

As best shown in FIG. 6, each of the latch members 120a-c has a projection 130a-c that extends above the upper surface 128 of the cylindrical body 114. Each of the projections 130a-c has a hook-shaped cross-section adapted to engage the annular lip 18b of the undercut groove 18 formed in the bottom surface of the hub assembly 16 of the disk cartridge 10 of FIGS. 1-3.

Figure 7:
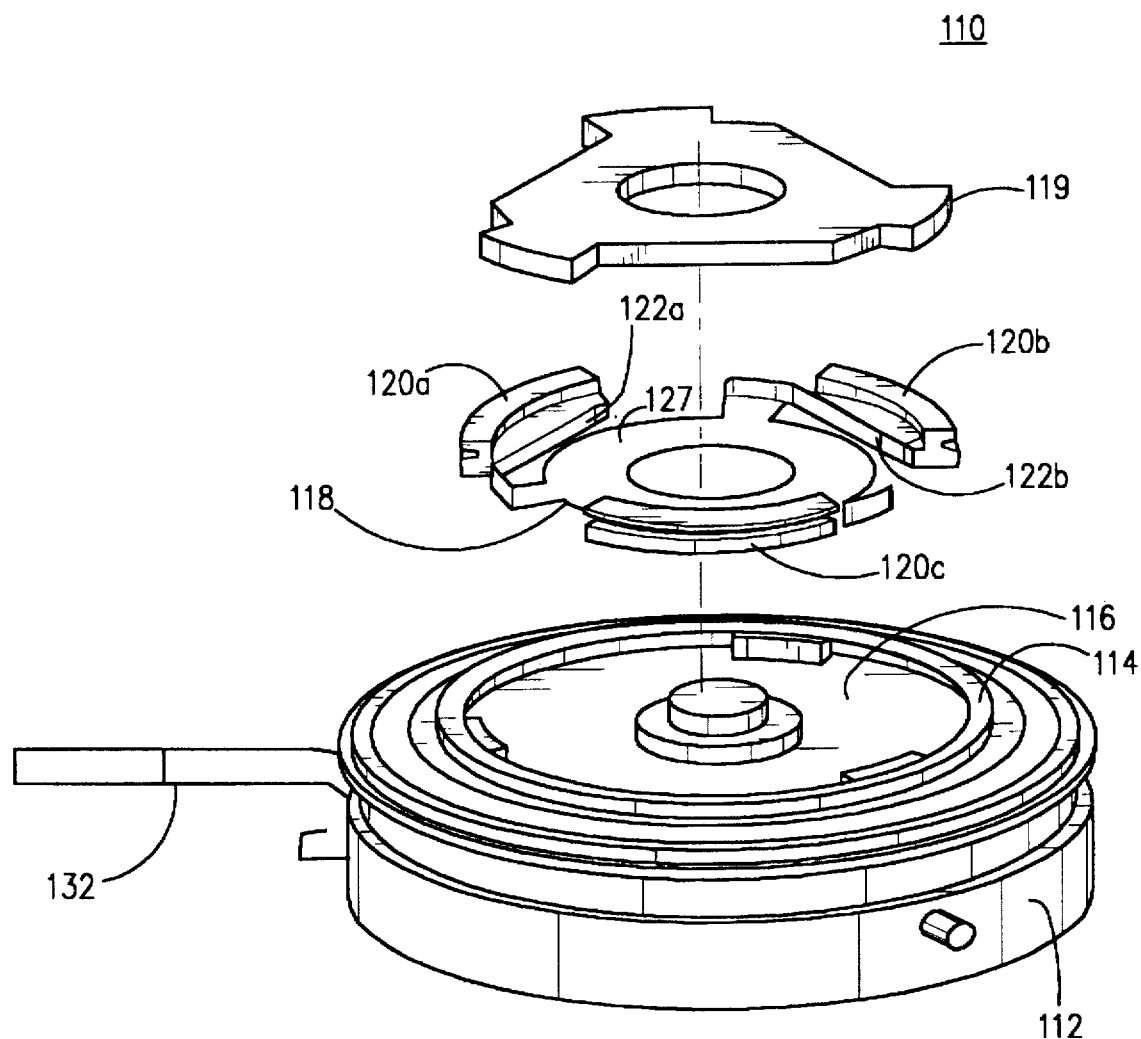
FIG. 7 is an exploded view of the spindle motor assembly of FIG. 5.

FIG. 7 is an exploded view of the spindle motor assembly 110 of FIG. 5 showing further details of the construction of the assembly 110 in accordance with the preferred embodiment. The flexures 122a–c are integrally formed from a single metallic sheet, and the latch members 120a–c are then attached to the respective flexures 122a–c as described hereinafter. The flexure and latch member assembly 118 is then mounted in a recess 116 formed in the upper portion of the cylindrical body 114. A substantially planar retaining member 119 secures the flexure and latch member assembly 118 within the recess 116. Preferably, the cylindrical body 114, the flexure and latch member assembly 118, and the retaining member 119 are all formed of metal, such as steel. However, any other suitable material may be employed.

Figure 8:
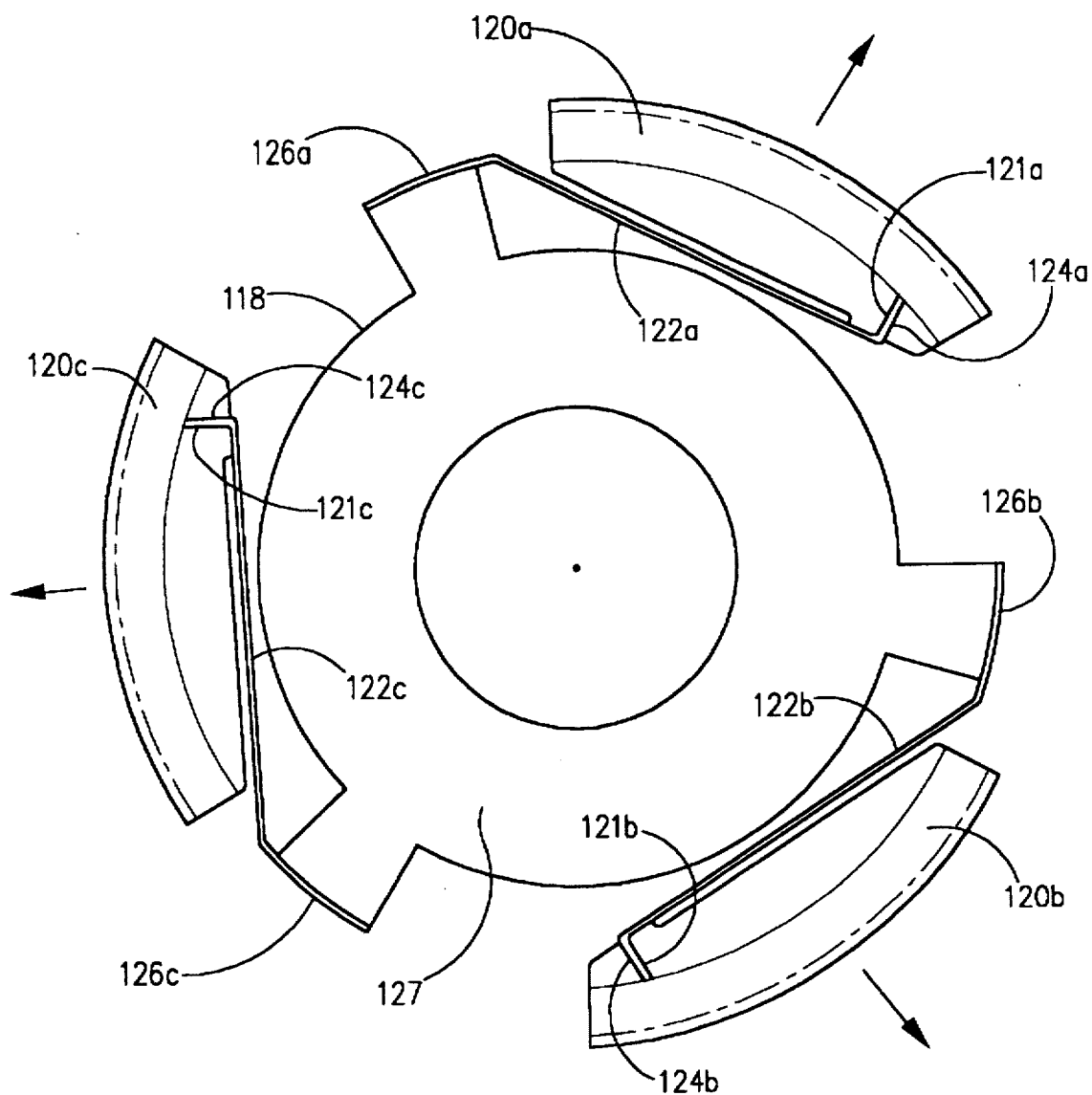
FIG. 8 is a top view of the flexure and latch member assembly of FIG. 7.

FIG. 8 is an enlarged view of the flexure and latch member assembly 118. As shown, each of the latch members 120a–c is mounted to the distal end of a respective flexure 122a–c by bending the distal end 124a–c of the flexure at approximately a right angle and inserting the bent end of the flexure into a narrow slit 121a–c in the latch member. Adhesive can be used to secure the ends of the flexures within the slits. The proximal end 126a–c of each flexure is integrally formed with a circular base portion 127 of the assembly 118. In the present embodiment, the circular base portion 127 and respective flexures 122a–c are stamped from a single sheet of metal, such as, for example, stainless steel having a thickness of approximately 0.125 mm. However, other suitable materials can be employed.

After stamping, the portions of the assembly defining the flexures 122a–c are bent upwards (as best shown in FIG. 7) at right angles to the base portion 127 to impart radial movement to distal ends 124a–c of each flexure. As the cylindrical body 114 of the spindle motor assembly 110 begins to rotate, centrifugal forces will act on each latch member 120a–c causing the latch members to move substantially radially outwardly on their respective flexures 122a–c in the directions indicated by the arrows in FIG. 8.

Figure 9:
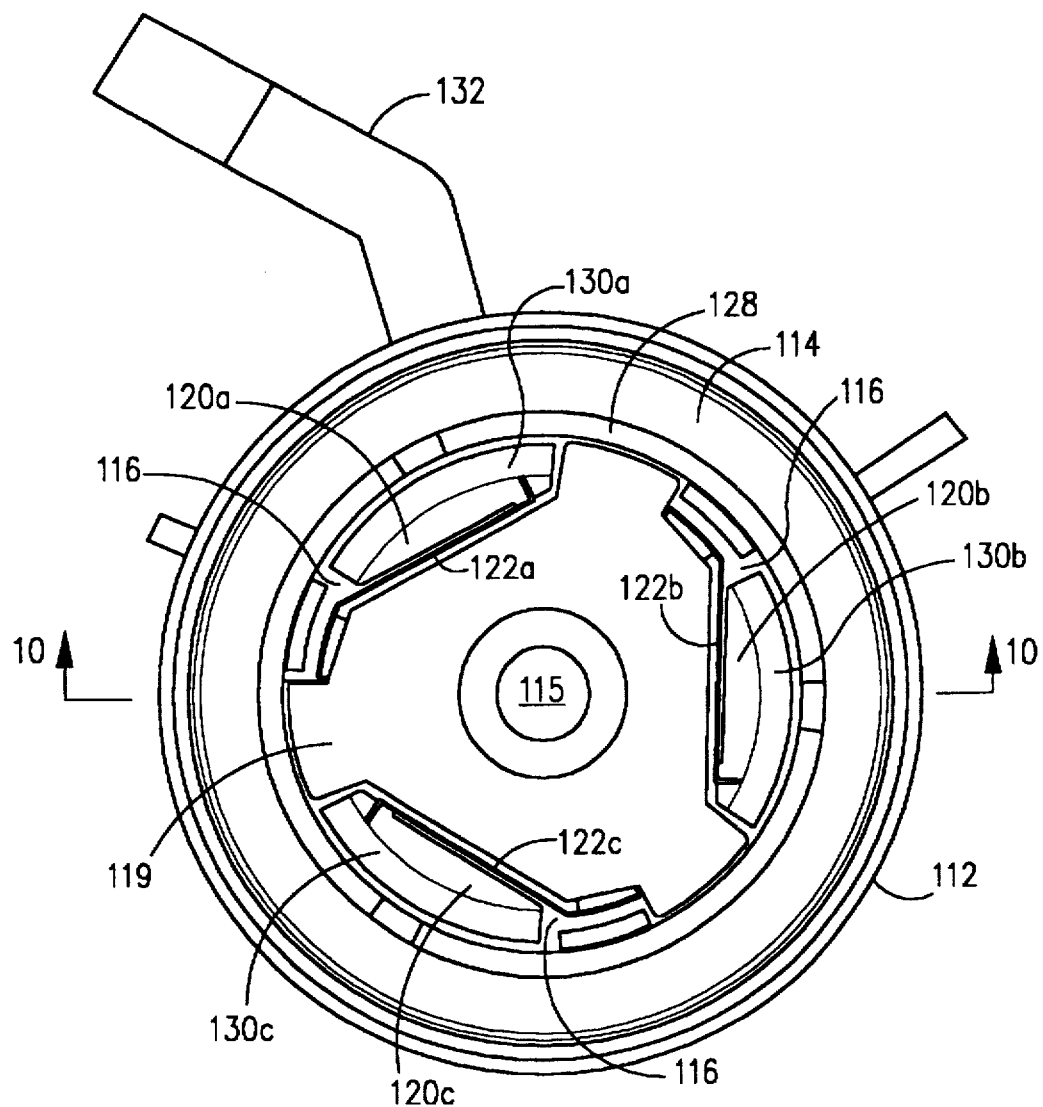
FIG. 9 is a top view of the spindle motor assembly of FIG. 5.
Figure 10:
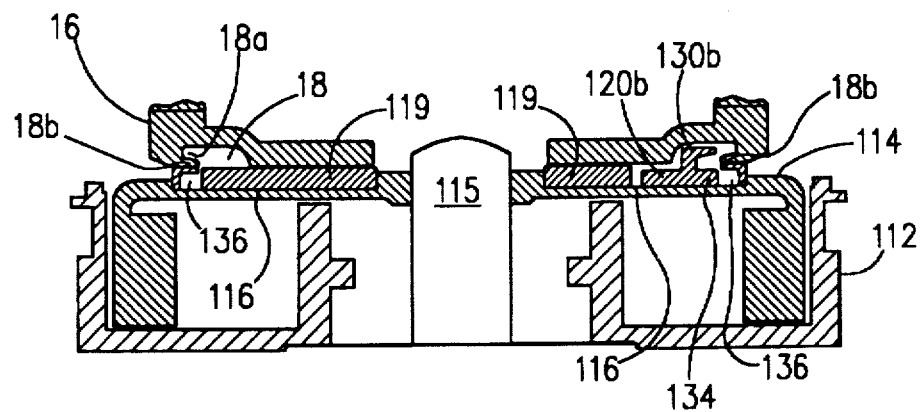
FIG. 10 is a cross-sectional view of the spindle motor assembly of the present invention taken along line 10—10 of FIG. 9 and further illustrating the engagement of the disk hub of FIGS. 3A-3B with the spindle motor assembly.

Operation of the hub locking mechanism of the present invention will now be described with reference to FIGS. 9–11. FIG. 9 is a top view of the spindle motor assembly 110 of FIG. 5. FIG. 10 is a cross-sectional view of the spindle motor assembly 110 taken along line 10—10 of FIG. 9. As FIG. 10 further illustrates, when the disk cartridge 10 of FIGS. 1–3 is inserted in the disk drive 20, the hub assembly 16 of the cartridge 10 engages the upper portion of the spindle motor assembly 110. In particular, the bottom surface 17 of the hub assembly 16 rests on the upper surface 128 of the cylindrical body 114 and on the upper surface of the retaining member 119. The upper surface 128 and retaining member 119 provide critical datums to position the hub assembly 16 precisely within the disk drive. The center spindle 115 of the spindle motor assembly 110 extends through a central aperture in the hub assembly 16. The annular groove 18 on the bottom surface of the disk hub assembly 16 receives the respective projections 130a–c of the latch members 120a–c. FIG. 10 shows the position of the latch members 120a–c when the spindle motor is at rest.

Figure 11:
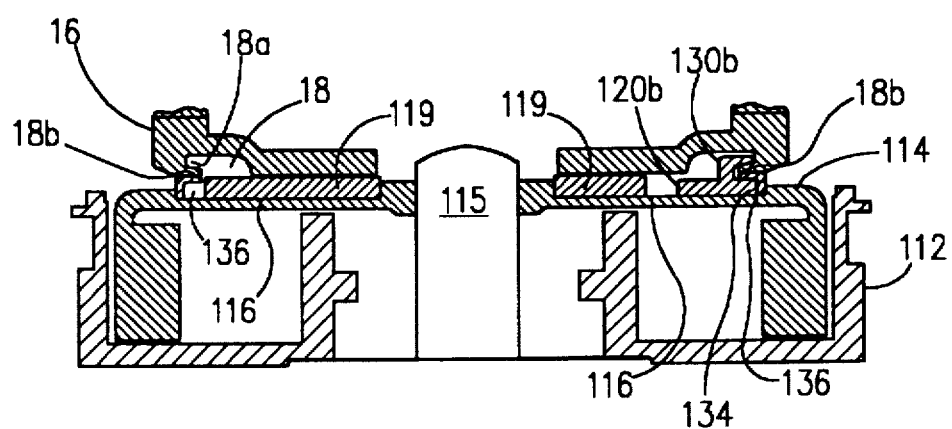
FIG. 11 is the same view as FIG. 10 showing the engagement of a latch member of the spindle motor assembly with the undercut groove of the disk hub during rotation of the spindle motor.

Referring to FIG. 11, and in accordance with the present invention, as the spindle motor begins to spin-up to its full operating speed (e.g., 5400 rpm), centrifugal forces act on the latch members 120a–c causing them to move radially outwardly on their respective flexures 122a–c until the latch projections 130a–c engage the annular lip 18b of the groove 18. Once engaged, the latch members 120a–c prevent the hub assembly 16 from separating from the cylindrical body 114 of the spindle motor assembly 110 during rotation.

The latch members 120a–c move in the recess 116 formed in the upper portion of the cylindrical body 114. The outer periphery of the recess 116 forms an annular undercut 136 with the upper surface 128 of the cylindrical body 114. As further illustrated in FIG. 11, a lateral projection 134 on the lower outer edge of each latch member 120a–c engages the annular undercut 136 when the latch members 120a–c move radially outwardly to their latched positions. This prevents the latch members 120a–c from lifting away from the upper portion of the cylindrical body 114 while the spindle motor is rotating.

When it is time to eject the disk cartridge 10, the spindle motor assembly 110 is brought back to rest. As the spindle motor 110 assembly spins down, the radial forces on the latch members 120a–c will dissipate, allowing the latch members 120a–c to spring back to the position shown in FIG. 10. The spindle motor assembly 16 can then be disengaged from the hub assembly.

As the foregoing illustrates, the present invention is directed to a mechanism for locking the hub of a removable disk cartridge to the spindle motor of a disk drive upon spin-up of the motor to prevent separation of the hub and spindle motor during high speed rotation. It is understood that changes may be made to the embodiment described above without departing from the broad inventive concepts thereof. For example, although three latch members 120a–c are employed in the preferred embodiment, other embodiments may employ one, two or more than three latch members. Additionally, while flexures 122a–c are employed in the preferred embodiment to impart radial movement to the latch members 120a–c, other means for movably mounting the latch members may be employed. Also, while the components of the hub locking mechanism of the present invention are preferably formed of metal, other suitable materials, such as plastic, can be employed. Accordingly, the present invention is not limited to the particular embodiments disclosed, but is intended to cover all modifications that are within the spirit and scope of the invention as defined by the appended claims.

What is claimed is:

1. A data storage system comprising:

a disk cartridge comprising a disk-shaped storage medium and a substantially cylindrical hub assembly on which the storage medium is mounted, said hub assembly having a continuous annular groove formed in a bottom surface thereof, the outer periphery of said continuous annular groove undercutting a portion of the bottom surface of said hub assembly to form an annular lip around the outer periphery of the groove; and a data storage device comprising a housing having an opening for receiving said disk cartridge, and a spindle motor comprising:

a cylindrical body having an upper portion that provides a critical datum for engaging the bottom surface of the hub assembly of said disk cartridge; and a latch member movably mounted on the cylindrical body, said latch member moving substantially radially outwardly of said cylindrical body upon rotation of said spindle motor to engage the continuous annular groove of the hub assembly of the disk cartridge and to prevent separation of the hub assembly from the spindle motor.

2. The data storage system of claim 1 wherein said latch member is movably mounted on the upper portion of said cylindrical body via a flexure, and wherein upon rotation of said spindle motor, centrifugal forces act upon said latch member causing said latch member to move on said flexure substantially radially outwardly of said cylindrical body.

3. The data storage system of claim 1 wherein said latch member has a projection extending above an upper surface of said cylindrical body, the projection having a hook-shaped cross-section that engages the annular lip of the groove formed in the bottom surface of the hub assembly of said disk cartridge when the latch member moves radially outwardly upon rotation of said spindle motor.

4. The data storage system of claim 1 wherein said latch member moves in a recess formed in the upper portion of said cylindrical body.

5. The data storage system of claim 4 wherein an outer edge of said recess forms an undercut with the upper portion of said cylindrical body, and wherein said latch member has a projection formed on its outer edge that engages said undercut when said latch member moves radially outwardly of said cylindrical body.

6. The data storage system of claim 1 wherein a plurality of latch members are movably mounted on said cylindrical body.

7. The data storage system of claim 6 wherein each of said plurality of latch members is movably mounted on the upper portion of said cylindrical body via a respective flexure.

8. The data storage system of claim 7 wherein said respective flexures are integrally formed with a thin circular base that is mounted in an annular recess in the upper portion of said cylindrical body.

9. The data storage system of claim 6 wherein said plurality of latch members comprises three latch members.

10. The data storage system of claim 9 wherein said three latch members are spaced substantially evenly about the circumference of the upper portion of said cylindrical body.

11. A disk cartridge for cooperation with a data storage device: said data storage device including a housing having an opening for receiving said disk cartridge, and a spindle motor; the spindle motor comprising a cylindrical body and a latch member; the cylindrical body having an upper portion that provides a datum for engaging said disk cartridge, the latch member movably mounted on the cylindrical body, said disk cartridge comprising:

a disk-shaped storage medium;
a substantially cylindrical hub assembly on which the storage medium is mounted;
a continuous annular groove formed in a bottom surface of said hub assembly, the outer periphery of said continuous annular groove undercutting a portion of the bottom surface of said hub assembly to form an annular lip around the outer periphery of the groove; and
an outer casing that houses the storage medium and hub assembly; said outer casing having an opening in a bottom surface thereof to provide access to the hub assembly said latch member moving substantially radially outwardly of said cylindrical body upon rotation of said spindle motor to engage said continuous annular groove of said hub assembly to prevent separation of said hub assembly from said spindle motor.

12. The disk cartridge of claim 11 wherein said continuous annular groove is about 2.2 millimeters wide and about 1.1 millimeters deep.

13. The disk cartridge of claim 11 wherein said bottom surface of said hub assembly is formed of a metal.

14. The disk cartridge of claim 11 wherein said disk-shaped storage medium comprises a rigid magnetic storage medium.

15. The disk cartridge of claim 11 wherein said disk-shaped storage medium comprises an optical storage medium.

16. The disk cartridge of claim 11 wherein said disk-shaped storage medium comprises a flexible magnetic storage medium.

17. The disk cartridge of claim 11 wherein said outer casing is formed of a plastic material.

18. A spindle motor for a data storage device of the type that receives a removable disk cartridge; said disk cartridge including a disk-shaped storage medium and a substantially cylindrical hub assembly on which the storage medium is mounted, said hub assembly having a continuous annular groove formed in a bottom surface thereof, the outer periphery of said continuous annular groove undercutting a portion of the bottom surface of said hub assembly to form an annular lip around the outer periphery of the groove; said data storage device comprising said spindle motor and a housing having an opening for receiving said cartridge, said spindle motor comprising:

a cylindrical body having an upper portion that provides a critical datum for engaging the bottom surface of the hub assembly of the removable disk cartridge; and
a latch member movably mounted on the cylindrical body via a flexure, said latch member moving on said flexure substantially radially outwardly of said cylindrical body, as said flexure bends outwardly upon rotation of the spindle motor, to engage the continous annular groove of the hub assembly of the disk cartridge and to prevent separation of the hub assembly from the spindle motor.

19. The spindle motor of claim 18 wherein said latch member has a projection extending above an upper surface of said cylindrical body, the projection having a hook-shaped cross-section that engages an undercut groove in a bottom surface of the hub assembly of said disk cartridge when said latch member moves radially outwardly upon rotation of said spindle motor.

20. The spindle motor of claim 18 wherein said latch member moves in a recess formed in the upper portion of said cylindrical body.

21. A spindle motor for a data storage device of the type that receives a removable disk cartridge, said spindle motor comprising:

a cylindrical body,
said cylindrical body having an upper portion that provides a critical datum for engaging a bottom surface of a hub assembly of the removable disk cartridge;
a recess formed in the upper portion of said cylindrical body, and a latch member, said latch member being movably mounted on said cylindrical body, said latch member moving substantially radially outwardly of said cylindrical body, upon rotation of said spindle motor to engage the continuous annular groove of the hub assembly of the disk cartridge an outer edge of said recess forming an undercut with the upper portion of said cylindrical body, said latch member having a projection formed on its outer edge that engages said cartridge to prevent separation of the hub assembly from the spindle motor.

22. The spindle motor of claim 18 wherein a plurality of latch members are movably mounted on said cylindrical body.

23. The spindle motor of claim 22 wherein each of said plurality of latch members is movably mounted on the upper portion of said cylindrical body via a respective flexure.

24. The spindle motor of claim 23 wherein said respective flexures are integrally formed with a thin circular base that is mounted in an annular recess in the upper portion of said cylindrical body.

25. The spindle motor of claim 22 wherein said plurality of latch members comprises three latch members.

26. The spindle motor of claim 25 wherein said three latch members are spaced substantially evenly about the circumference of the upper portion of said cylindrical body.

27. A data storage device of the type that receives a disk cartridge including a disk-shaped storage medium and a substantially cylindrical hub assembly on which the storage medium is mounted, said hub assembly having a continuous annular groove formed in a bottom surface thereof, the outer periphery of said continuous annular groove undercutting a portion of the bottom surface of said hub assembly to form an annular lip around the outer periphery of the groove; said data storage device comprising:

a housing having an opening for receiving a removable disk cartridge that has a hub assembly to which at least one disk-shaped storage medium is mounted; and a spindle motor comprising:
a cylindrical body having an upper portion that provides a critical datum for engaging the bottom surface of the hub assembly of the disk cartridge; and
a latch member movably mounted on the cylindrical body via a flexure, said latch member moving on said flexure substantially radially outwardly of said cylindrical body, as said flexure bends outwardly upon rotation of the spindle motor, to engage the continuous annular groove the hub assembly of the disk cartridge and to prevent separation of the hub assembly from the spindle motor.

28. The data storage device of claim 27 wherein said latch member has a projection extending above an upper surface of said cylindrical body, the projection having a hook-shaped cross-section that engages an undercut groove in a bottom surface of the hub assembly of said disk cartridge when said latch member moves radially outwardly upon rotation of said spindle motor.

29. The data storage device of claim 27 wherein said latch member moves in a recess formed in the upper portion of said cylindrical body.

30. The data storage device of claim 27 wherein a plurality of latch members are movably mounted on said cylindrical body.

31. The data storage device of claim 30 wherein each of said plurality of latch members is movably mounted on the upper portion of said cylindrical body via a respective flexure.

32. The data storage device of claim 31 wherein said respective flexures are integrally formed with a thin circular base that is mounted in an annular recess in the upper portion of said cylindrical body.

33. The data storage device of claim 30 wherein said plurality of latch members comprises three latch members.

34. The data storage device of claim 33 wherein said three latch members are spaced substantially evenly about the circumference of the upper portion of said cylindrical body.

35. A data storage device comprising:

a housing having an opening for receiving a removable disk cartridge that has a hub assembly to which at least one disk-shaped storage medium is mounted, and a spindle motor comprising
a cylindrical body having an upper portion that provides a critical datum for engaging a bottom surface of a hub assembly of the disk cartridge;
and a latch member, the cylindrical body movably mounted on said cylindrical body, said latch member moving substantially radially outwardly of said cylindrical body in a recess formed in the upper portion of said cylindrical body upon rotation of the spindle motor to engage the continuous annular groove of the hub assembly of the disk cartridge and to prevent separation of the hub assembly from the spindle motor, an outer edge of said recess forming an undercut with the upper portion of said cylindrical body, said latch member having a projection formed on its outer edge that engages said undercut when said latch member moves radially outwardly of said cylindrical body.

* * * * *